(12) United States Patent
Choi et al.

(10) Patent No.: US 7,148,932 B2
(45) Date of Patent: *Dec. 12, 2006

(54) COMMUNICATION SYSTEM IN DIGITAL TELEVISION

(75) Inventors: In Hwan Choi, Seoul (KR); Young Mo Gu, Seoul (KR); Kyung Won Kang, Seoul (KR); Kook Yeon Kwak, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 762 days.

This patent is subject to a terminal disclaimer.

(21) Appl. No.: 09/956,070

(22) Filed: Sep. 19, 2001

(65) Prior Publication Data

US 2002/0037056 A1    Mar. 28, 2002

(30) Foreign Application Priority Data

Sep. 22, 2000    (KR) .......................... 2000-0055854

(51) Int. Cl.
*H04N 5/44* (2006.01)
(52) U.S. Cl. .................... 348/725; 348/726; 348/466
(58) Field of Classification Search ................ 348/725, 348/726, 461, 466, 553–555, 473, 423; 375/265, 375/242, 262, 340–341; *H04N 5/44*
See application file for complete search history.

(56) References Cited

U.S. PATENT DOCUMENTS

| 5,087,975 | A | 2/1992 | Citta et al. |
| 5,233,630 | A | 8/1993 | Wolf |
| 5,488,691 | A | 1/1996 | Fuoco et al. |
| 5,555,024 | A | 9/1996 | Limberg et al. |
| 5,563,884 | A | 10/1996 | Fimoff et al. |
| 5,583,889 | A | 12/1996 | Citta et al. |
| 5,600,677 | A | 2/1997 | Citta et al. |
| 5,602,595 | A | 2/1997 | Citta et al. |
| 5,629,958 | A | 5/1997 | Willming |
| 5,636,251 | A | 6/1997 | Citta et al. |

(Continued)

FOREIGN PATENT DOCUMENTS

KR    2000-0018531 A    4/1997

(Continued)

OTHER PUBLICATIONS

U.S. Appl. No. 60/198,014, Bretl et al.

*Primary Examiner*—Trang Tran
(74) *Attorney, Agent, or Firm*—Lee, Hong, Degerman, Kang & Schmadeka

(57) ABSTRACT

Disclosed is a digital communication system. A transmission system includes an error correction encoder part carrying out an error correction encoding for additional data inputted through a first path, a multiplexer (MUX) part, a control part, a channel coding part carrying out an RS encoding and a TCM encoding, and a VSB transmission part modulating the channel-coded data by a VSB method and outputting the modulated data. A receiver system includes a tuner part receiving and tuning additional data and ATSC data transmitted through a same channel, a TCM decoder decoding and outputting the ATSC data and additional data, a deinterleaver deinterleaving data outputted from the TCM decoder, a demultiplexer demultiplexing along a first path (ATSC) or a second path (additional data) in accordance with a kind of output data of the deinterleaver, a limiter carrying out a hard decision on data outputted by the first path, an ATSC decoder part including a derandomizer, and an additional error correction decoder part decoding additional-error-encoded data on additional data outputted through the second path.

5 Claims, 2 Drawing Sheets

U.S. PATENT DOCUMENTS

| | | | |
|---|---|---|---|
| 5,636,252 A | | 6/1997 | Patel et al. |
| 5,686,966 A | * | 11/1997 | De La Cierva, Sr. ....... 348/461 |
| 5,706,312 A | | 1/1998 | Wei |
| 5,831,690 A | | 11/1998 | Lyons et al. |
| 5,923,711 A | | 7/1999 | Willming |
| 5,946,047 A | | 8/1999 | Levan |
| 6,040,867 A | * | 3/2000 | Bando et al. .......... 375/240.27 |
| 6,075,569 A | | 6/2000 | Lee et al. |
| 6,122,015 A | * | 9/2000 | Al-Dhahir et al. .......... 348/614 |
| 6,208,643 B1 | | 3/2001 | Dieterich et al. |
| 6,490,002 B1 | | 12/2002 | Shintani |
| 6,519,298 B1 | | 2/2003 | Kim |
| 6,690,738 B1 | | 2/2004 | Swenson et al. |
| 6,697,098 B1 | | 2/2004 | Wang |
| 6,708,149 B1 | | 3/2004 | Turin |
| 6,724,832 B1 | | 4/2004 | Hershberger |
| 6,744,822 B1 | * | 6/2004 | Gaddam et al. ............ 375/265 |
| 6,743,025 B1 | | 7/2004 | Leatherbury et al. |
| 6,760,077 B1 | | 7/2004 | Choi et al. |
| 6,788,710 B1 | | 9/2004 | Knutson et al. |
| 2002/0041608 A1 | * | 4/2002 | Choi et al. .................. 370/535 |
| 2002/0085632 A1 | | 7/2002 | Choi et al. |
| 2004/0240590 A1 | | 12/2004 | Cameron et al. |
| 2005/0041748 A1 | * | 2/2005 | Choi et al. .................. 375/265 |
| 2005/0041749 A1 | * | 2/2005 | Choi et al. .................. 375/265 |
| 2005/0129132 A1 | * | 6/2005 | Choi et al. ............. 375/240.27 |

FOREIGN PATENT DOCUMENTS

| | | | |
|---|---|---|---|
| KR | 2000-0028757 A | | 5/2000 |

* cited by examiner

COMMUNICATION SYSTEM IN DIGITAL TELEVISION

BACKGROUND OF THE INVENTION

1. Field of the Invention

The present invention relates to a digital communication system carrying out modulation/demodulation using a VSB (vestigial side band) method.

2. Background of the Related Art

An 8VSB transmission system for terrestrial wave digital broadcasting is taken as a U.S. standard system in 1995 is test-broadcasted from the latter half of the year 1998. Such a test broadcasting using a terrestrial wave digital broadcasting standard based on the U.S. standard system is being carried out in Korea as well.

In such a digital broadcasting system, a transmitted signal is received by a receiver through a terrestrial channel. In order to restore the signal in the receiver despite the noise caused by the channel, the signal is variously coded to be transmitted. In response to the various coding process, the receiver carries out the corresponding decoding process so as to restore the transmitted signal. U.S. patents, of which applicant is Zenith Co., such as U.S. Pat. Nos. 5,636,251, 5,629,958, 5,600,677 and the like are characterized in that each derandomizer carries out derandomization by receiving a hard input.

Lately, a broadcasting station tries to transfer such a digital broadcasting, which transfers mainly audio and video data, to which various additional data are attached. The additional data includes stock-market information, weather casting, program guide information, HTML, execution files and the like.

Different from general audio/video data in channel transmission, the additional data are vulnerable fatally to an influence of the channel noise. For example, the damaged additional data of which information itself is defected may inform a viewer with wrong information, while the damaged general audio/video data just result in light image/voice loss. Specifically, when the additional data include numbers or an execution file, a minor data error causes a devastating result of failing the entire operation.

SUMMARY OF THE INVENTION

Accordingly, the present invention is directed to a digital communication system that substantially obviates one or more problems due to limitations and disadvantages of the related art.

An object of the present invention is to provide a VSB transmission system and a reception system thereof fitting for transmitting additional data as well as robust to a noise.

Another object of the present invention is to provide a VSB transmission system and a reception system thereof compatible with a conventional VSB system.

A further object of the present invention is to provide a VSB transmission system and a reception system thereof enabling to improve a decoding capability for an error correction by receiving a soft input on an additional error correction/restoration.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a transmission system in a digital TV according to the present invention includes an error correction encoder part carrying out an error correction encoding for additional data inputted through a first path, a multiplexer (MUX) part multiplexing ATSC data inputted through a second path and the additional data error-correction-encoded through the first path so as to output serial data, a control part controlling whether a randomizing is carried out in a path inputted through the first and second paths, a channel coding part carrying out an RS encoding and a TCM encoding on a processing result of the randomizing, and a VSB transmission part modulating the channel-coded data by a VSB method and outputting the modulated data.

Preferably, the control part bypasses the randomizing when input data are the additional data inputted through the first path, thereby enabling an additional error correction decoder of a receiver to receive a soft input to be processed. In this case, the ATSC data are audio and video data to be transmitted by a conventional VSB method.

In another aspect of the present invention, a receiver system in a digital TV includes a tuner part receiving and tuning additional data and ATSC data transmitted through a same channel, a TCM decoder decoding and outputting the ATSC data and additional data, a deinterleaver deinterleaving data outputted from the TCM decoder, a demultiplexer demultiplexing along a first path (ATSC) or a second path (additional data) in accordance with a kind of output data of the deinterleaver, a limiter carrying out a hard decision on data outputted by the first path, an ATSC decoder part including a derandomizer, and an additional error correction decoder part decoding additional-error-encoded data on additional data outputted through the second path.

In a further aspect of the present invention, a receiver system in a digital TV includes a tuner part receiving and tuning additional data and ATSC data transmitted through a same channel, a TCM decoder decoding and outputting the ATSC data and additional data, a deinterleaver deinterleaving data outputted from the TCM decoder, a demultiplexer demultiplexing along a first path (ATSC) or a second path (additional data) in accordance with a kind of output data of the deinterleaver, a limiter carrying out a hard decision on data outputted by the first path, an ATSC decoder part including a derandomizer, and an additional error correction decoder part decoding additional-error-encoded data on additional data outputted through the second path.

Preferably, the TCM decoder in the receiver is a decoder producing a soft output signal with a soft input signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Generally, a receiver includes a derandomizer carrying out a hard output by receiving a hard input, wherein the hard input/output mean that a hard-decision value is inputted and the hard-decision value is outputted, respectively. On the other hand, soft input/output mean that a value of a probability for a determined value is outputted. The present invention uses an additional error correction encoder, whereby an additional error correction decoder is necessary. Yet, such an additional error correction decoder has a poor decoding performance when an input is a hard input. In order to maximize the decoding performance, the additional error correction decoder should receive a soft input.

Therefore, the additional data processed in the transmitter fail to pass through a randomizer so as to bypass the randomizer, whereby an input of the additional error correction decoder in the receiver enables to have the soft input.

Reference will now be made in detail to the preferred embodiments of the present invention, examples of which are illustrated in the accompanying drawings.

Figure 1:
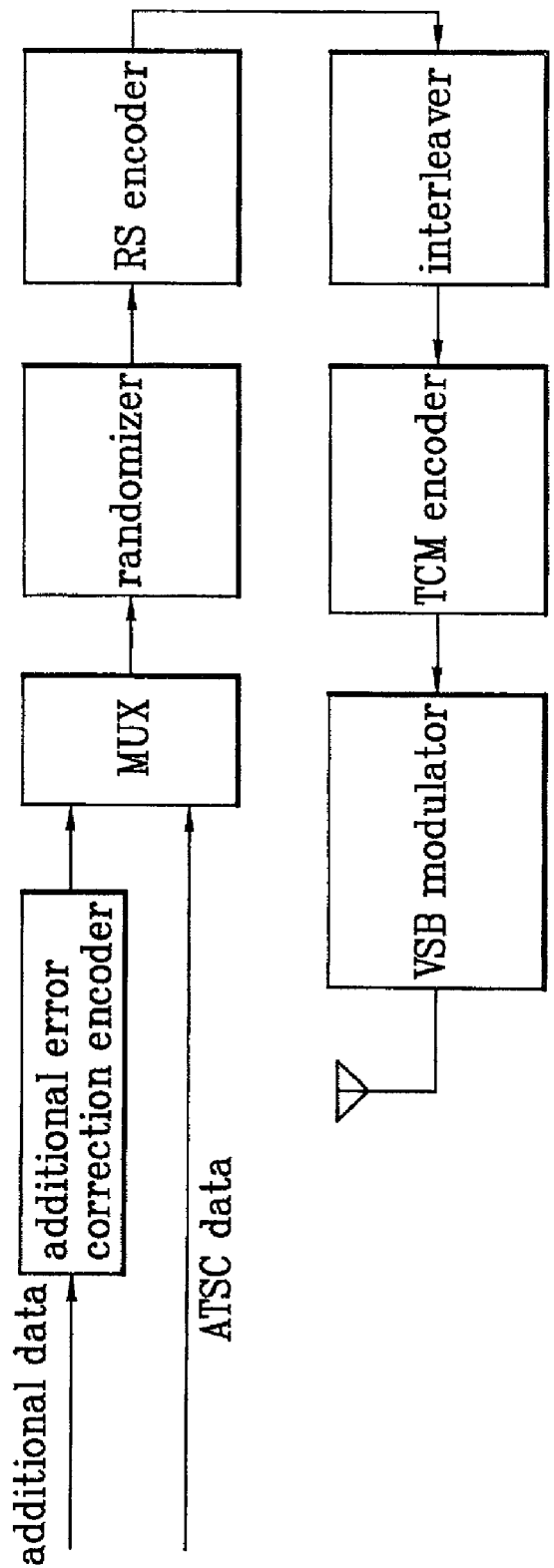
FIG. 1 illustrates a constructional diagram of a transmitter part according to the present invention.
Figure 2:
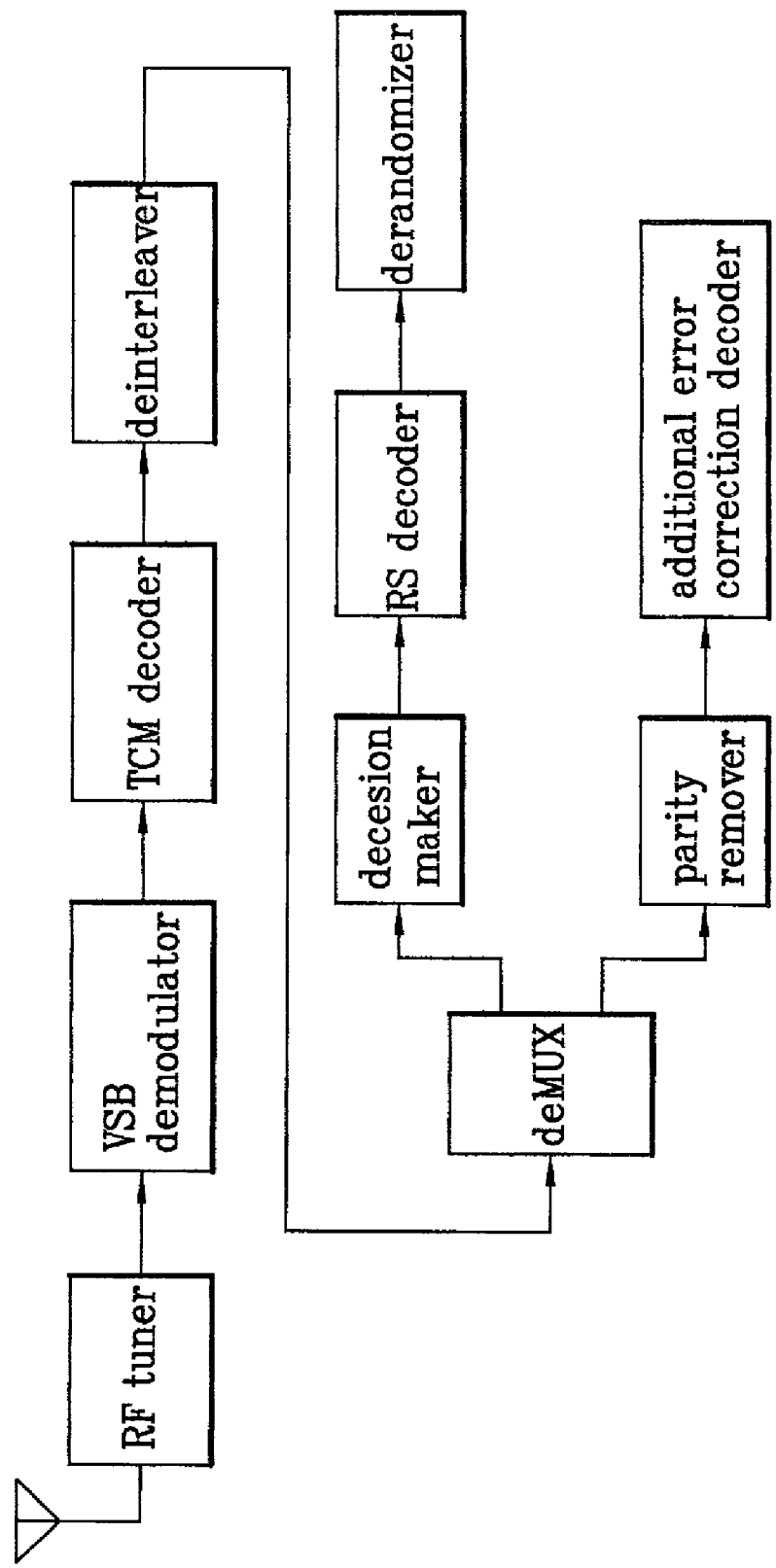
FIG. 2 illustrates a constructional diagram of a receiver part according to the present invention.

FIG. 1 illustrates a basic diagram of a transmitter according to the present invention, and FIG. 2 illustrates a constructional diagram of a receiver corresponding to the transmitter in FIG. 1.

Referring to FIG. 1, additional data are encoded by an error correction encoder via first path. A kind of the encoder depends on a designer's choice. Thus, the encoder may be one of a convolutional encoder, an RS encoder, a combination of the convolutional/RS encoders and the like. And, general audio/video data as a program are inputted thereto via a second path, which are the audio/video data compressed by a general MPEG method (hereinafter abbreviated ATSC data). The data inputted through the first and second paths are multiplexed by a MUX so as to be outputted as a series of serial data. The additional data inputted via the first path are bypassed without passing through a randomizer, which is controlled by controlling the randomizer in response to a MUXing control signal when the MUXing is carried out (not shown in the drawing). The bypassed additional data experience a channel coding process in a manner of passing through an RS encoder adding a parity thereto, an interleaver carrying out an interleaving, and a TCM encoder for a TCM encoding process so as to be modulated by a VSB method. Thus, the bypassed additional data are transmitted in such a way.

Moreover, ATSC data, which are inputted, pass through a channel coding process by a conventional terrestrial wave digital method and then are modulated by a VSB modulation method so as to be transmitted. Namely, the ATSC data experience a randomizing process and then are outputted to the RS encoder. And, the data, which are transmitted by the VSB modulation method finally, include the ATSC and addition data in one channel so as to be transmitted. Of course, the ATSC data can be transmitted only without the additional data.

FIG. 2 illustrates a constructional diagram of a receiver part according to the present invention, in which a channel demodulation process is carried out in response to FIG. 1.

Referring to FIG. 2, a tuner carries out a channel tuning process on the transmitted data inputted through a terrestrial channel. Then, the tuned data undergo the processes of a timing recovery, a carrier wave recovery, a channel equalization, a phase correction and the like. Finally, the tuner outputs a baseband signal finally. Such a channel-demodulated signal becomes decoded through a TCM decoder, of which output value is a soft value which is not the value determined after the decoding but corresponds to a probability value of its own. This, as mentioned in the above explanation, is for receiving a soft input when the additional error correction decoding is carried out. The TCM-decoded soft value is deinterleaved by a deinterleaver. A soft value outputted by the deinterleaver is then divided into two paths of ATSC and additional data by a deMUX (not shown in the drawing) so as to be outputted.

In case of ATSC data, a value, which is determined by a decision part (or a limiter) for the soft value outputted by the deinterleaver, is outputted as a hard value. This is because input and output of the RS decoder as well as a derandomizer should be the hard values.

The data decoded by the RS decoder are then derandomized by a derandomizer. The derandomized data are outputted to a transport decoder thereafter.

In case of additional data, a decoding process for an additional error correction is carried out on the soft value outputted by the deMUX, before which a parity removal part removing a value corresponding to the RS parity added on transmission is further included. A difference between the parity removal part and the above-explained RS decoder lies in whether the decoding process is carried out using the parity value. Namely, the case of ATSC data carries out the RS decoding process using the parity. But, the case of additional data removes the parity only.

An error correction process is carried out on the additional data removed by the parity removal part by an additional error correction decoder which may be designed to correspond to the encoder of the transmitter. Data outputted from the error correction are finally outputted to a transport decoder. Instead, the data outputted from the error correction decoder may be displayed to a viewer after being processed by an additional processor without passing through the transport.

The ATSC data are separated into video and audio video data, decoded by an MPEG decoder and an audio decoder respectively, and finally outputted to a display/speaker.

A TCM decoding algorithm for outputting a soft value according to the present invention follows.

As mentioned in the above explanation, in order to maximize a performance of the additional error correction decoder, a soft output has to be produced by a decoder if an internal code. SOVA (soft output viterbi algorithm) and MAP (maximum A posteriori) are algorithms for producing a soft output for a trellis coded input column. In aspect of a symbolic error, the MAP algorithm is superior to SOVA. However, the optimal MAP algorithm has disadvantages such as a calculation of probability in an exponential domain and a presumption of a noise variance of a transmission channel.

Besides, there is SSA (suboptimum soft output algorithm) as a sort of the MAP algorithm, in which a probability is calculated in a logarithmic domain without reducing a performance of the receiver and the presumption of the noise variance is unnecessary.

Therefore, if the SSA algorithm is used as a decoding algorithm, four soft outputs, which are shown in the following calculation formula 1, are produced for the input bits d1 and d0 of the encoder.

[Calculation Formula 1]

$$L(00) \propto \_Log\ P(d1d0=00|observation)$$

$$L(01) \propto \_Log\ P(d1d0=01|observation)$$

$$L(10) \propto \_Log\ P(d1d0=10|observation)$$

$$L(11) \propto \_Log\ P(d1d0=11|observation) \quad (e1)$$

The soft outputs produced by the SSA decoder are measurements of the probability values for four kinds of combinations of "d1" and "d0" attained after the decoding. Meanwhile, when a convolutional code as an external code is used, these soft outputs are directly used as the branch metric.

As mentioned in the above description, the digital communication system according to the present invention enables to improve a performance by the additional error correction code of the receiver, thereby increasing accuracy for additional data.

Moreover, the present invention is compatible with a conventional receiver receiving ATSC data.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A receiver system in a digital TV, comprising:
   a tuner part receiving and tuning additional data and ATSC data transmitted through a same channel;
   a TCM decoder decoding and outputting the ATSC data and the additional data;
   a deinterleaver deinterleaving data outputted from the TCM decoder;
   a demultiplexer demultiplexing along a first path(ATSC) or a second path(additional data) in accordance with a kind of output data of the deinterleaver;
   a limiter carrying out a hard decision on data outputted by the first path;
   an ATSC decoder part including a derandomizer; and
   an additional error correction decoder part decoding additional-error-encoded data on additional data outputted through the second path.

2. The receiver system of claim 1, wherein the TCM decoder produces to output a soft value.

3. The receiver system of claim 1, further comprising a parity removal part removing only a parity added to the additional data separated into the second path by the demultiplexer wherein the parity is added on transmission.

4. A receiving method of a digital TV, comprising:
   selecting a demanded channel only by receiving and tuning additional data and ATSC data transmitted with an RE frequency through a same channel;
   demodulating the selected channel into a frequency of a baseband;
   TCM decoding on the demodulated signal so as to output an output value which is a soft value;
   deinterleaving the outputted soft value;
   separating an outputted value in accordance with a result of the interleaving into the ATSC data and additional data along a first path and a second path respectively;
   outputting a hard value by carrying out a hard decision on the ATSC data outputted along the first path;
   RS decoding and derandomizing the outputted hard value; and
   additional error correction decoding the additional data outputted through the second path so as to decode additional-error-encoded data.

5. The receiving method of claim 4, further comprising a parity added to the additional data separated into the second path by the demultiplexer, wherein the parity is added on transmission.

* * * * *